US012754127B2

(12) United States Patent
Badin et al.

(10) Patent No.: US 12,754,127 B2
(45) Date of Patent: Oct. 6, 2026

(54) OPTICAL PARTICULATE SENSOR PROTRUDING OUT OF AIRCRAFT SURFACE

(71) Applicant: Honeywell International s.r.o., Prague (CZ)

(72) Inventors: Pavel Badin, Doln•• Kounice (CZ); Kaizhong Gao, North Oaks, MN (US); Viktor Drazan, Brno (CZ); Jan Oklestek, Brno (CZ)

(73) Assignee: Honeywell International s.r.o., Chodov (CZ)

( * ) Notice: Subject to any disclaimer, the term of this patent is extended or adjusted under 35 U.S.C. 154(b) by 165 days.

(21) Appl. No.: 18/656,784

(22) Filed: May 7, 2024

(65) Prior Publication Data

US 2025/0264396 A1 Aug. 21, 2025

Related U.S. Application Data

(60) Provisional application No. 63/555,791, filed on Feb. 20, 2024.

(51) Int. Cl.
*G01N 15/1434* (2024.01)
*B64D 45/00* (2006.01)

(52) U.S. Cl.
CPC ......... *G01N 15/1434* (2013.01); *B64D 45/00* (2013.01)

(58) Field of Classification Search
CPC ............. G01N 15/1434; G01N 21/538; G01N 2021/4709; G01N 2201/0214; G01N 15/075; G01N 15/1459; G01N 2015/0026; G01N 2015/0046; G01N 15/0205; B64D 45/00
See application file for complete search history.

(56) References Cited

U.S. PATENT DOCUMENTS

| | | | |
|---|---|---|---|
| 3,094,625 A | 6/1963 | Hendrick, Jr. | |
| 10,119,908 B2 * | 11/2018 | Hayashi | G01N 15/1459 |
| 10,191,160 B1 * | 1/2019 | Newman | G01T 1/20 |
| 10,232,949 B2 | 3/2019 | English et al. | |
| 11,754,484 B2 | 9/2023 | Fan et al. | |
| 2020/0049625 A1 | 2/2020 | Garde et al. | |

(Continued)

FOREIGN PATENT DOCUMENTS

| | | |
|---|---|---|
| EP | 3099576 B1 | 12/2018 |
| EP | 3454087 A1 | 3/2019 |
| GB | 2511344 A | 9/2014 |

OTHER PUBLICATIONS

European Patent Office, "Extended European Search Report", dated Jul. 8, 2025, from EP Application No. 25154711.3, from Foreign Counterpart to U.S. Appl. No. 18/656,784, pp. 1 through 11, Published: EP.

(Continued)

*Primary Examiner* — Seung C Sohn
(74) *Attorney, Agent, or Firm* — Fogg & Powers LLC

(57) ABSTRACT

Systems and methods are directed to protruding a portion of a particle sensor out from the exterior surface of a vehicle. In some embodiments, the protruding component is the collection optics that are used to receive backscattered light from a detection region. The protruding component can protrude out towards the detection region to reduce the sampling distance between the detected particles and the collection optics.

20 Claims, 10 Drawing Sheets

(56) References Cited

U.S. PATENT DOCUMENTS

| | | | | |
|---|---|---|---|---|
| 2022/0161933 | A1 | 5/2022 | Sly et al. | |
| 2022/0170837 | A1 | 6/2022 | Lincoln et al. | |
| 2022/0270498 | A1 | 8/2022 | Wienkes | |
| 2022/0404272 | A1 * | 12/2022 | Kendall | B64U 20/87 |

OTHER PUBLICATIONS

Droplet Measurement Technologies, "CAPS-DPOL", as downloaded May 30, 2024 from https://www.dropletmeasurement.com/product/cloud-aerosol-and-precipitation-spectrometer-with-depolarization/, pp. 1 through 6.

Droplet Measurement Technologies, "CDP-2", as downloaded May 30, 2024 from https://www.dropletmeasurement.com/product/cloud-droplet-probe/, pp. 1 through 5.

Droplet Measurement Technologies, "CIP" as downloaded May 30, 2024 from https://www.dropletmeasurement.com/product/cloud-imaging-probe/, pp. 1 through 5.

Droplet Measurement Technologies, "PIP", as downloaded May 30, 2024 from https://www.dropletmeasurement.com/product/precipitation-imaging-probe/, pp. 1 through 6.

* cited by examiner

OPTICAL PARTICULATE SENSOR PROTRUDING OUT OF AIRCRAFT SURFACE

CROSS-REFERENCE TO RELATED APPLICATIONS

This application claims the benefit of U.S. Provisional Application Ser. No. 63/555,791, filed Feb. 20, 2024, and titled "OPTICAL PARTICULATE SENSOR PROTRUDING OUT OF AIRCRAFT SURFACE", the contents of which are hereby incorporated herein by reference in their entirety.

STATEMENT REGARDING GOVERNMENT SPONSORED RESEARCH OR DEVELOPMENT

The project leading to the application has received funding from the Clean Aviation Joint Undertaking under grant agreement No 101102008 under European Union's Horizon 2020 research and innovation programme.

BACKGROUND

Particle sensors are implemented in many types of aircraft for navigation sensing. Such sensors can be implemented as a lidar system that uses optical signals to analyze characteristics of small and large particulate matter in the surrounding environment of the aircraft (aerosol particles, such as water droplets, ice crystals, volcanic ash, sand, and dust particles). However, particle sensors typically require large transmitting and/or collection optics in order to properly detect different varieties of particles. For smaller aircraft, such as unmanned aerial vehicles, conventional optical particle sensors may not be a viable solution due to size and weight limitations.

Therefore, a need exists to reduce the size and weight of existing optical particle sensors.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of any patents, applications and publications as identified herein to provide yet further embodiments.

Systems and methods are directed to protruding a portion of a particle sensor out from the exterior surface of a vehicle. In some embodiments, the protruding component is the collection optics that are used to receive backscattered light from a detection region. The protruding component can protrude out towards the detection region to reduce the sampling distance between the detected particles and the collection optics. In doing so, the particle sensor can be designed with less size and weight than existing optical particle sensors.

In one embodiment, a system is disclosed. The system comprises transmitting optics comprising a light source configured to direct a light beam to a detection region outside of a vehicle. The system comprises collection optics configured to capture reflected or scattered light from one or more particles in the detection region. The system comprises at least one processor configured to determine one or more characteristics of the one or more particles in the detection region based on the reflected or scattered light. A portion of the collection optics and/or transmitting optics protrudes outward from an exterior surface of the vehicle towards the detection region.

In another embodiment, a particle sensor is disclosed. The particle sensor comprises transmitting optics comprising a light source configured to direct a light beam to a detection region outside of a vehicle. The particle sensor comprises collection optics configured to capture reflected or scattered light from one or more particles in the detection region. The particle sensor comprises at least one processor configured to determine one or more characteristics of the one or more particles in the detection region based on the reflected or scattered light. A portion of the collection optics and/or transmitting optics protrudes outward from an exterior surface of the vehicle towards the detection region.

In yet another embodiment, a method is disclosed. The method comprises transmitting, by transmitting optics, a light beam to a detection region outside of a vehicle. The method comprises receiving, by collection optics reflected or scattered light from one or more particles in the detection region. The method comprises determining one or more characteristics of the one or more particles in the detection region based on the reflected or scattered light. A portion of the collection optics and/or the transmitting optics protrudes outward from an exterior surface of the vehicle towards the detection region.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as subsequently described and as described in conjunction with the detailed description.

Figure 1:
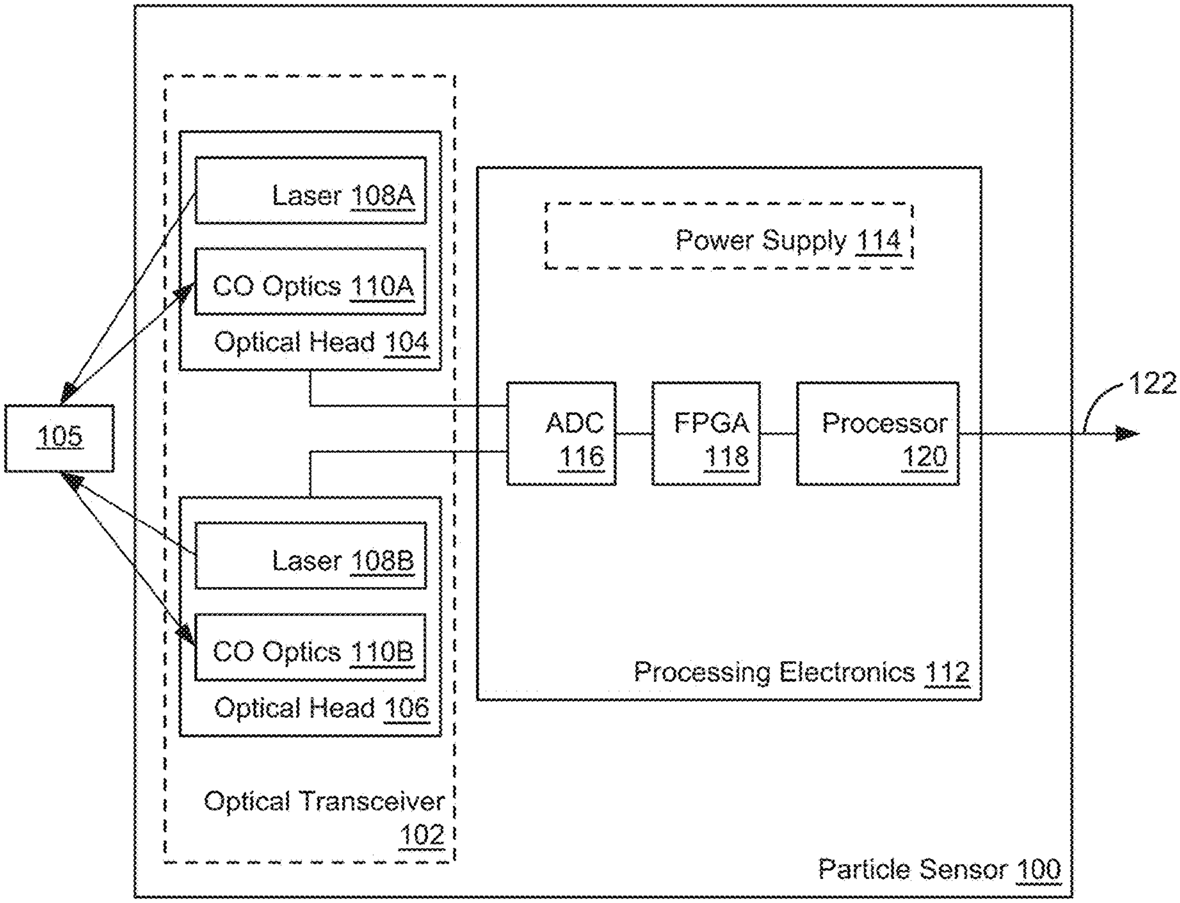
FIG. 1 depicts a block diagram of a particle sensor, as described in one or more embodiments.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, any methods presented in the drawing figures and the specification are not to be construed as limiting the order in which the individual steps may be performed. The following detailed description is, therefore, not to be taken in a limiting sense.

FIG. 1 depicts a block diagram of a particle sensor 100. Particle sensor 100, as well as the other sensors described herein, can be implemented on a vehicle such as an aircraft. While an aircraft is described pedagogical explanation, other vehicles can also be used. Additionally, particle sensor 100 can be implemented on a variety of different types of aircraft, such as commercial aircraft, unmanned aerial vehicles, urban air mobility vehicles, and the like. In various embodiments, particle sensor 100 can be a backscatter cloud probe detector (BCPD) and/or large particle detector (LPD).

Particle sensor 100 advantageously (and optionally) includes a dual optical head transceiver 102 comprising a first optical head 104 and a second optical head 106. First optical head 104 is implemented to detect small particles (e.g., particles having a radius between 4-100 microns) while second optical head 106 is implemented to detect large particles (e.g., particles having a radius between 100-1000 microns). Both optical heads 104, 106 form part of the dual optical head transceiver 102 that can be implemented in order to reduce the size and weight of the particle sensor 100 instead of distributing the optical heads 104, 106 in different parts of the aircraft. However, in other embodiments only a single optical head is used.

Each optical head 104, 106 includes transmitting and collection (CO) optics that are used to probe the external environment of the aircraft. Optical head 104 includes a laser 108A or other light source configured to generate a light beam, while the optical head 106 includes a laser 108B or other light source configured to generate a light beam. In general, the wavelengths of the lasers 108A, 108B may differ in order to detect suitable particles in the environment. Each light beam is transmitted out of the aircraft into a detection region 105. During aircraft motion, aerosol particles such as water droplets, dust, and volcanic ash undergo relative motion to the aircraft through the detection region 105 as a freestream fluid. The detection region 105 is defined by an appropriate sampling volume that may change depending on the particle type, particle number concentration and particle size distribution. For example, when detecting larger particles using optical head 106, the sampling volume in detection region 105 may be larger to accommodate for the higher radius of the detectable particles. In contrast, the sampling volume in detection region 105 may decrease when using optical head 104 to detect smaller particles.

In order to detect particles passing through detection region 105, the light beams transmitted by one of optical heads 104, 106 interact with the particles, and the light is then scattered from the interaction. The scattering properties of the backscattered light can be modeled via classical scattering principles (e.g., Rayleigh scattering, Mie scattering, or Geometric optics, depending on the size of the particles and the wavelength of the transmitted light). The backscattered light is then collected by one of the optical heads 104, 106 and is collected via collection optics 110A, 110B.

The received light is converted to a proportional electrical signal by the collection optics 110A, 110B (e.g., by a photodiode), which is then passed to processing electronics 112. Processing electronics 112 is configured to process and analyze the received light signal to determine the characteristics of the detected particles in the detection region 105. As shown in FIG. 1, processing electronics 112 includes an analog-digital converter (ADC) 116, which generates a digital electronic signal from the analog signal received from collection optics 110A, 110B. The digital electronic signal is then output to a field programmable gate array (FPGA) 118 for additional pre-processing before outputting a processed signal to processor 120. Processor 120 is configured to determine one or more characteristics of the particles in detection region 105. Such characteristics include the particle(s) size, type of particle(s) present, particle distribution in the sampling volume, liquid and solid water content, and others. Processor 120 can also output other processing and/or control signals to other systems onboard the aircraft via output 122.

In general, processing electronics 112 may include more or fewer circuit components than as depicted in FIG. 1. For example, while a power supply 114 is illustrated to provide power for the particle sensor 100, in some embodiments particle sensor 100 receives power from another source and hence power supply 114 is optional. Additionally, particle sensor 100 may include different processing circuitry, or may not include processing circuitry in embodiments where signals are provided to an external processing system for signal processing. Aerodynamical analysis may be implemented to model boundary layer effects, droplet break-up, shadow zones for droplets, and ice crystal shattering at the sensor installation location. The aerodynamical model can be used to correct the measurement error caused by the above-mentioned items.

Processor 120, and processing electronics 112 more generally, may include any one or combination of processors, microprocessors, digital signal processors, application specific integrated circuits, field programmable gate arrays, and/or other similar variants thereof. Such processing systems may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

Figure 2A:
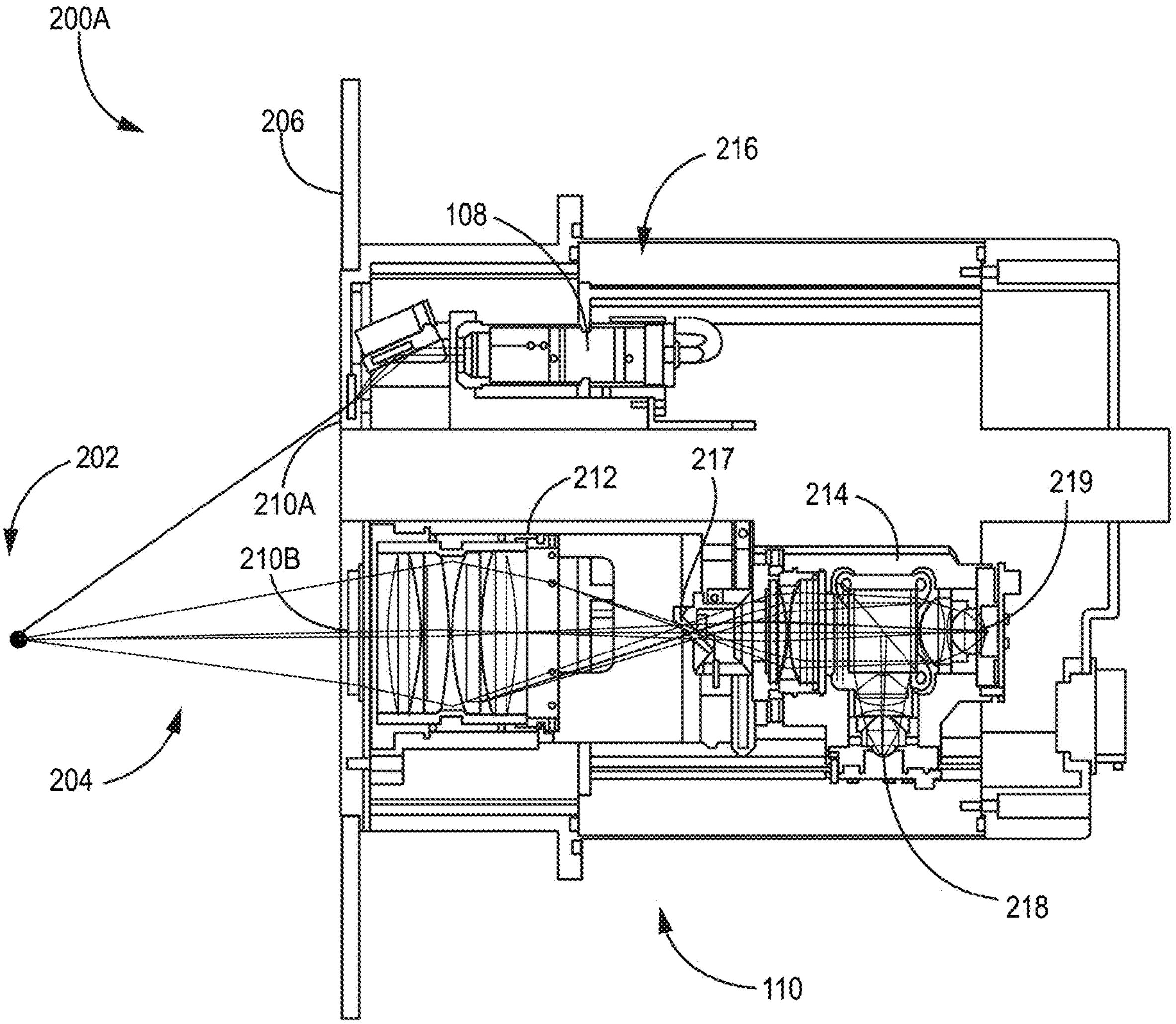
FIG. 2A depicts a schematic diagram of one implementation of a particle sensor, as described in one or more embodiments.

FIG. 2A depicts a schematic diagram of one implementation of a particle sensor 200A. Particle sensor 200A is completely disposed in the aircraft interior and includes transmitting optics 216 and collection optics 110. In some embodiments, particle sensor 200A is coupled in the aircraft wing or nose. Transmitting optics 216 includes a transmitting laser 108, which can transmit light into the detection region 105 as described with respect to FIG. 1. Specifically, the transmitted light from laser 108 exits through an aperture 210A into the exterior environment outside the fuselage 206 of the aircraft.

The transmitted light interacts with particles in the detection region 105. In FIG. 2A, the region includes a sampling volume 202 that 'travels' with the reference frame of the aircraft. As the aircraft moves, particles of varying origin may pass through sampling volume 202 in detection region 105 and may collide with photons from the transmitted light. The backscattered light is then received by collection optics 110 via aperture 210B, which, in the embodiment of FIG. 2A, comprises a series of lenses 212 coupled to slit 217, polarizing beam splitter 214 and two avalanche photodiodes 218, 219. The slit 217 defines minimal and maximal sampling distance of the sensor. The lenses 212 are oriented to generate a beam profile of the backscattered light, which passes through the slit 217 and enters the polarizing beam splitter 214. Back-scattered light polarization is dependent on the type of particle being detected. Polarizing beam splitter 214 splits the back-scattered light into two polarization planes and each polarization plane response is measured by dedicated avalanche photodiode 218, 219. The type of a particle is indicated by ratio of back-scattered light polarization measured by avalanche photodiodes 218, 219. The size of a particle is indicated by amplitude of back-scattered light, which is a sum of signal from both avalanche photodiodes 218, 219. Avalanche photodiodes 218, 219 convert the optical signal into an electric signal, which is then processed as described in FIG. 1.

The transmitting laser 108 is configured to transmit light at an appropriate angle so that the sampling volume 202 is a certain distance away from the aircraft. This distance is the sampling distance 204 shown in FIG. 2A, which is pedagogically illustrated as 100 mm away from the exterior of the aircraft. In general, the farther away the sampling distance 204, the bigger sized aperture 210B is needed to collect the backscattered light, and hence larger collection optics 110 are needed to focus and collect the light. This increases the size and weight of the particle sensor 200A in the aircraft. However, for many applications, it is desirable to analyze particles remote from the aircraft exterior since the motion of the aircraft may perturb the motion of the particles in the surrounding environment (e.g., immediately proximate to the fuselage 206).

Figure 2B:
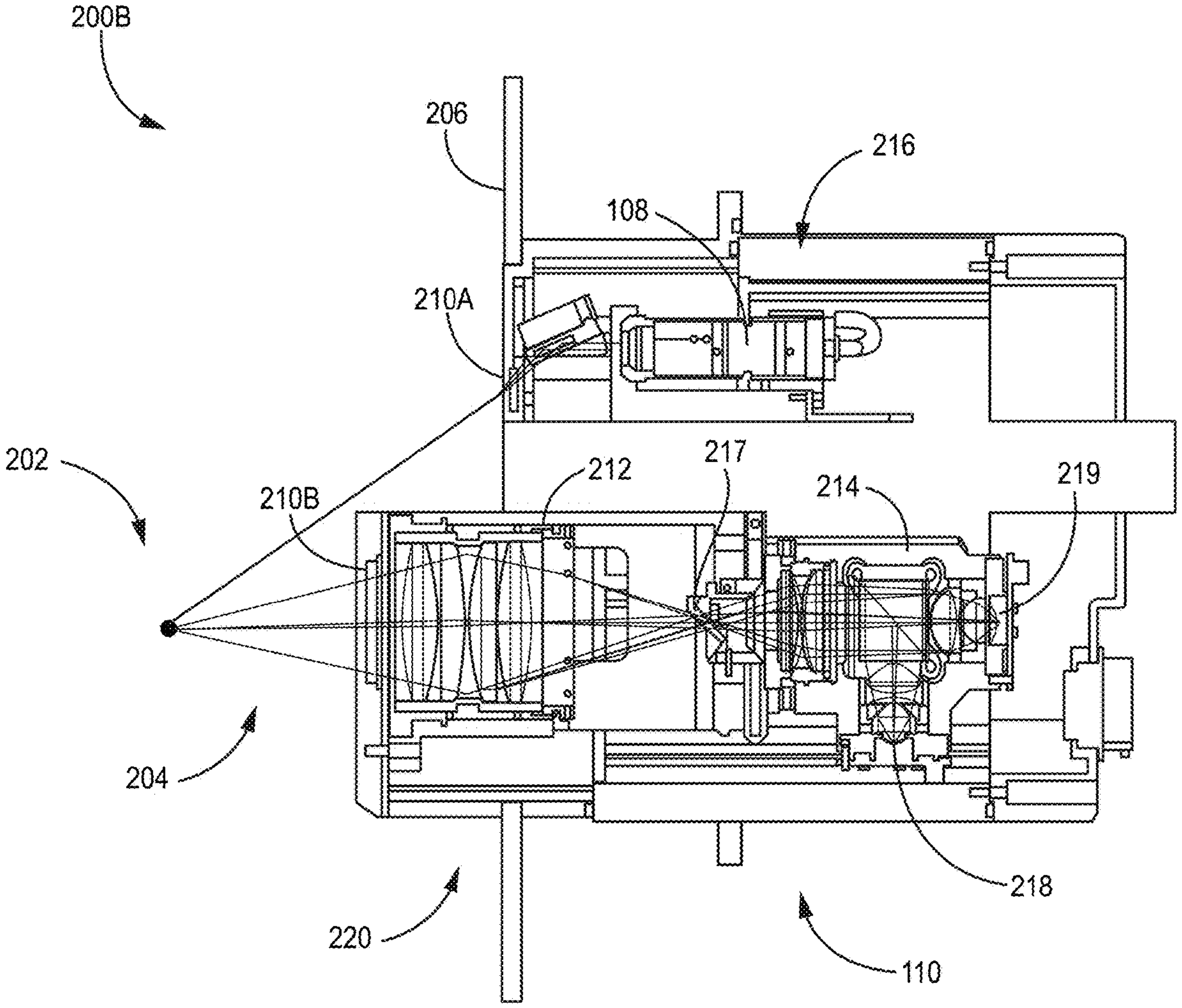
FIG. 2B depicts a schematic diagram of a particle sensor that protrudes out from the surface of an aircraft, as described in one or more embodiments.

FIG. 2B depicts a schematic diagram of a particle sensor 200B that protrudes out from the surface of an aircraft. Particle sensor 200B operates similarly as described with respect to particle sensors 100, 200A, and general operation of particle sensor 200B is omitted for brevity. Advantageously, particle sensor 200B protrudes outward from the aircraft. More specifically, in contrast to particle sensor 200A, particle sensor 200B includes a protruding component 220 that is exposed to the exterior of the aircraft. In the embodiment shown in FIG. 2B, protruding component 220 extends 43 mm out from the fuselage 206 of the aircraft. As used herein, protrusion from a surface or fuselage of the aircraft means protrusion from the surrounding exterior of the aircraft that is exposed to the atmosphere.

By protruding outward towards the detection region 105 and the sampling volume 202, the size of the particle sensor 200B can be reduced as compared with particle sensor 200A. As the distance from the detection region 105 (the sampling volume 202) to the entering aperture 210B is reduced, the collection angle (that is, the solid angle) of the backscattered light from the particles to lenses 212 in the collection optics 110 is increased. As a result, signal-to-noise level of the processing signals increases at processing electronics 112 for determining characteristics of the particles in sampling volume 202. The protrusion has one more benefit: aerosol content could be present between the detection region 105 (the sampling volume 202) and the aperture 210B. The aerosol content may change the properties of the backscattered light, such as optical power or polarization. Reducing the distance between the detection region 105 (the sampling volume 202) and the entering aperture 210B results in higher measurement accuracy as the backscattered signal is less affected by the aerosol content. For example, in particle sensor 200A, the width of the collection optics 110 (e.g., lenses 212) is 3.5 inches. However, in particle sensor 200B, the width of the collection optics is 2 inches. Additionally, while the length of the collection optics 110 is 505 mm in particle sensor 200A, in FIG. 2B, the length of the collection optics is 290 mm (including the protruding component 220).

Despite the difference in size, particle sensor 200B can detect particles the same distance away from the aircraft exterior as with particle sensor 200A. Using specific exemplary measurements, if protruding component 220 extends 43 mm, and the sampling distance 204 is 57 mm from the protruding component 220, the distance from the aircraft exterior (if protruding component 220 were not present) is 43 mm+57 mm=100 mm, the same sampling distance for particle sensor 200A. When the transmitted light from laser 108 scatters from colliding with particles in the sampling volume 202, the backscattered light can travel less distance before entering aperture 210B and focused by lenses 212. Hence, particle sensor 200B can detect and analyze particles with smaller optical components, thereby enabling such as sensor to be implemented in vehicles in which particle sensors may not be feasible (e.g., small, unmanned vehicles). Even in larger aircraft, particle sensor 200B reduces the size and weight of the particle sensor, thereby enabling additional systems to be implemented on the aircraft if desirable. In the embodiment shown in FIG. 2B, protruding component 220 only includes the lenses 212; however, other portions of the collection optics 110 may protrude outward as well.

In various embodiments, the protrusion length can extend anywhere from 10-55 mm from the nearby fuselage 206. However, this range is only exemplary and the protrusion length can extend out of this range as well.

Figure 3:
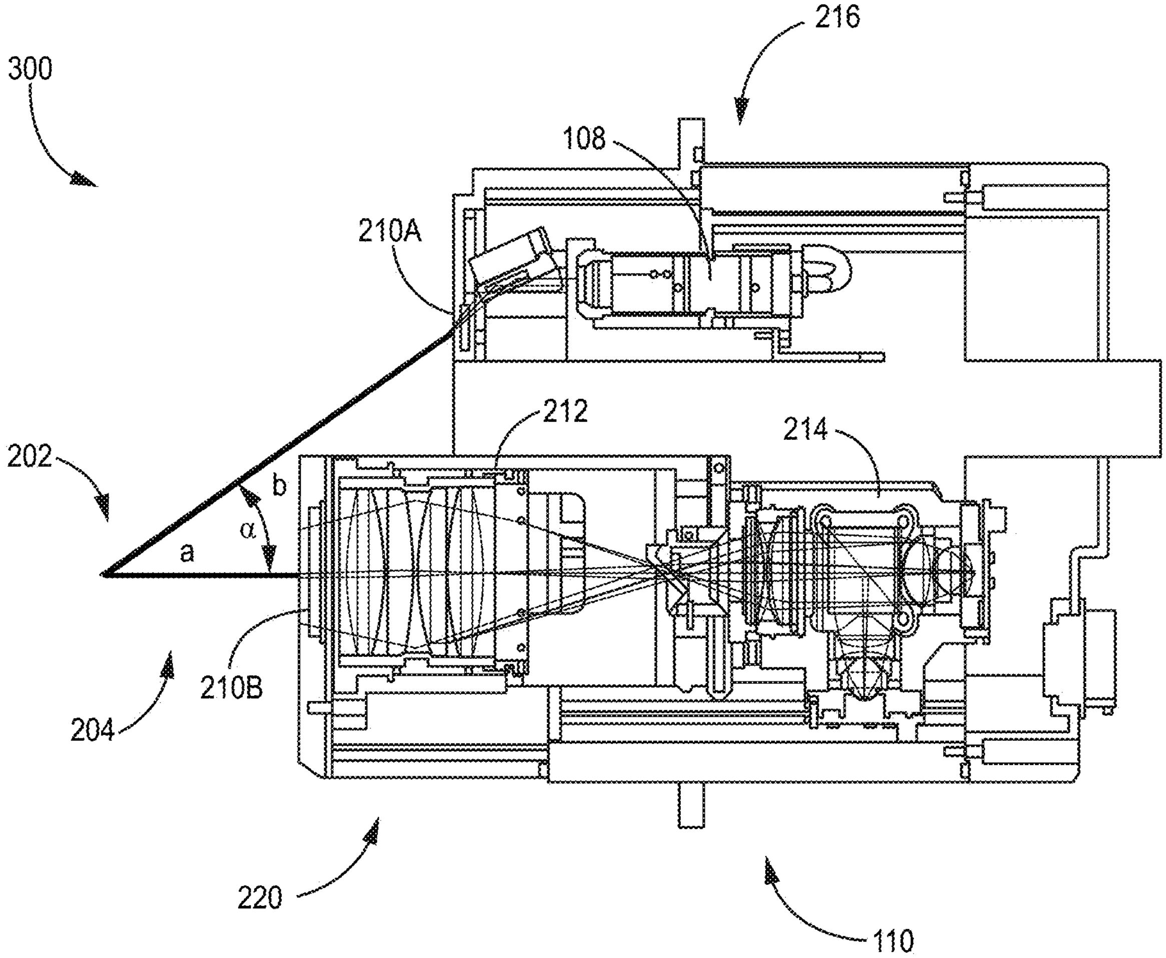
FIG. 3 depicts a schematic diagram of a particle sensor that protrudes out from the surface of an aircraft, as described in one or more embodiments.

FIG. 3 depicts a schematic diagram of a particle sensor 300 that protrudes out from the surface of an aircraft. Particle sensor 300 operates similarly to particle sensor 200B, with additional considerations further described as follows. In FIG. 3, the scattering angle with an aerosol particle in sampling volume 202 is a, which assuming a right triangle geometry, can be determined by the equation:

$$\alpha = \tan^{-1} b/a$$

where a=27 mm in FIG. 3. To prevent interference of the transmitting beam with the protruding component 220, the angle α between the laser 108 beam axis and receiving optical axis should be set so that the transmitting beam propagates unimpeded to the sampling volume 202. For example, the orientation of the laser 108 can be set at the appropriate angle to direct the transmitting beam out of aperture 210A that avoids the protruding component 220. In the embodiment shown in FIG. 3, α is 33.4 degrees, with a protrusion depth of 30 mm and a sampling distance of 27 mm. In one embodiment, the diameter of lenses 212 is 1 inch and the diameter of the receiving protrusion is expected to be 1.4 inches. In some embodiments, the chassis of the protruding component 220 is designed so that the protruding component 220 is capable of withstanding increased aerodynamical drag. As subsequently described, heating elements can be integrated into the sensor 300 (such as in the chassis of the protruding component 220) to prevent ice accretion on the protruding component 220 and entering aperture 210B.

Figure 4:
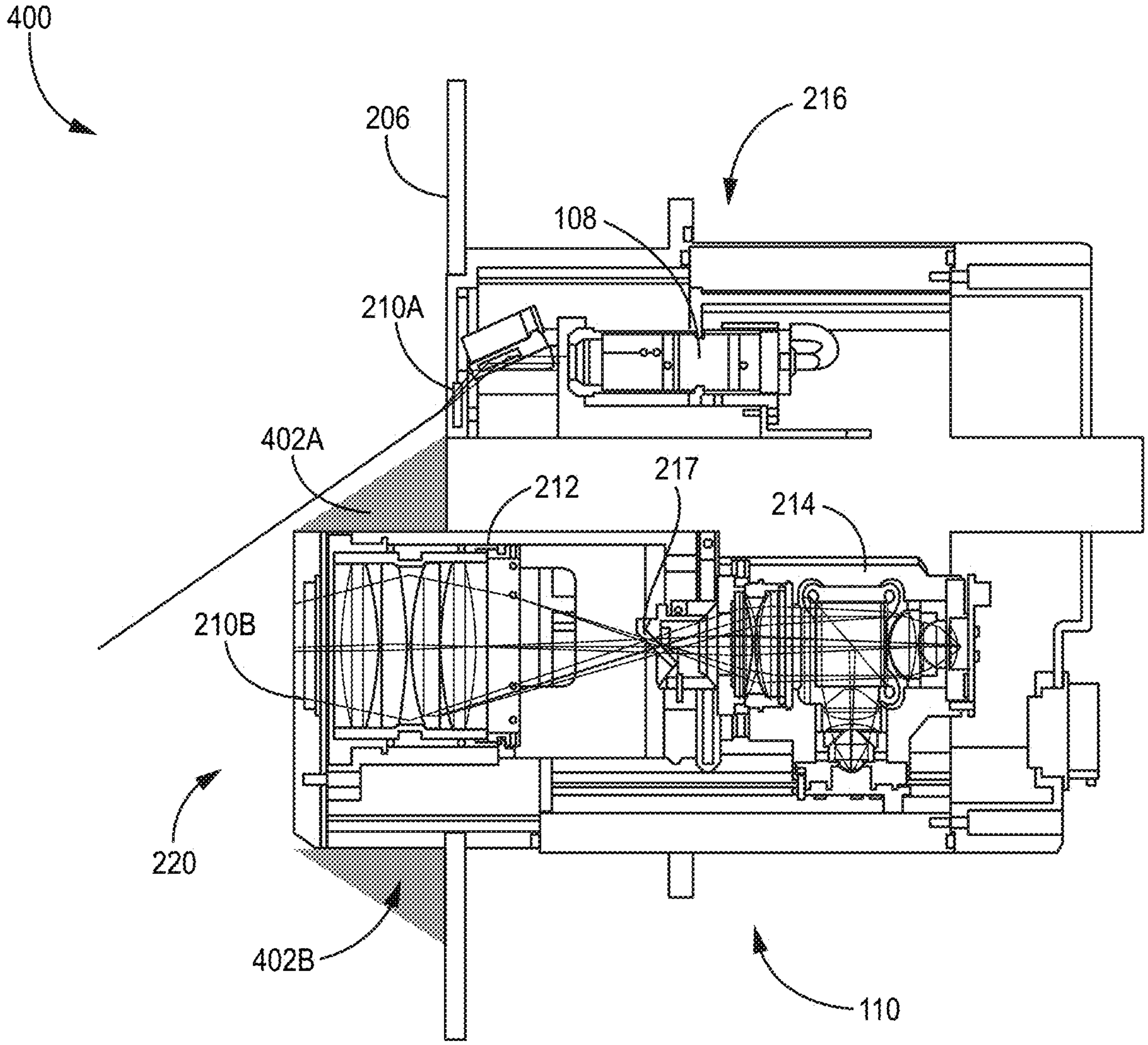
FIG. 4 depicts a schematic diagram of a particle sensor with external surface elements configured to reduce drag on the aircraft, as described in one or more embodiments.

FIG. 4 depicts a schematic diagram of a particle sensor 400. Particle sensor 400 operates similarly to the particles sensors previously described, but in the embodiment of FIG. 4, particle sensor 400 includes external surface elements 402A, 402B coupled to the protruding component 220 on the exterior of the aircraft fuselage 206. The surface elements 402A, 402B are coupled on either side of (or wrapped around) protruding component 220 and are generally configured to improve the acrodynamics of the aircraft. For example, surface elements 402A, 402B can reduce drag or other adverse effects from aircraft motion as a result of extending protruding component 220 out from the aircraft fuselage 206. Each surface element 402A, 402B can be made of a metal or other sturdy material that is permanently or semi-permanently affixed to the protruding component 220 and the aircraft fuselage 206. In some embodiments, the surface elements 402A, 402B comprise the same material as the surrounding fuselage 206 of the aircraft. In the embodiment shown in FIG. 4, surface elements 402A, 402B have a triangular shape, but may also be trapezoidal in shape or other geometrical shape that improves the aerodynamic properties of the aircraft. The exterior surface of the surface elements 402A, 402B exposed to the air can also be curved to further reduce any adverse aerodynamic effects. In another embodiment, one or both surface elements 402A, 402B can wrap around the protruding component 220 and include an electric coil or other heating element. During operation, the heating element can be used to remove accumulated ice on or in the protruding component 220.

Figure 5:
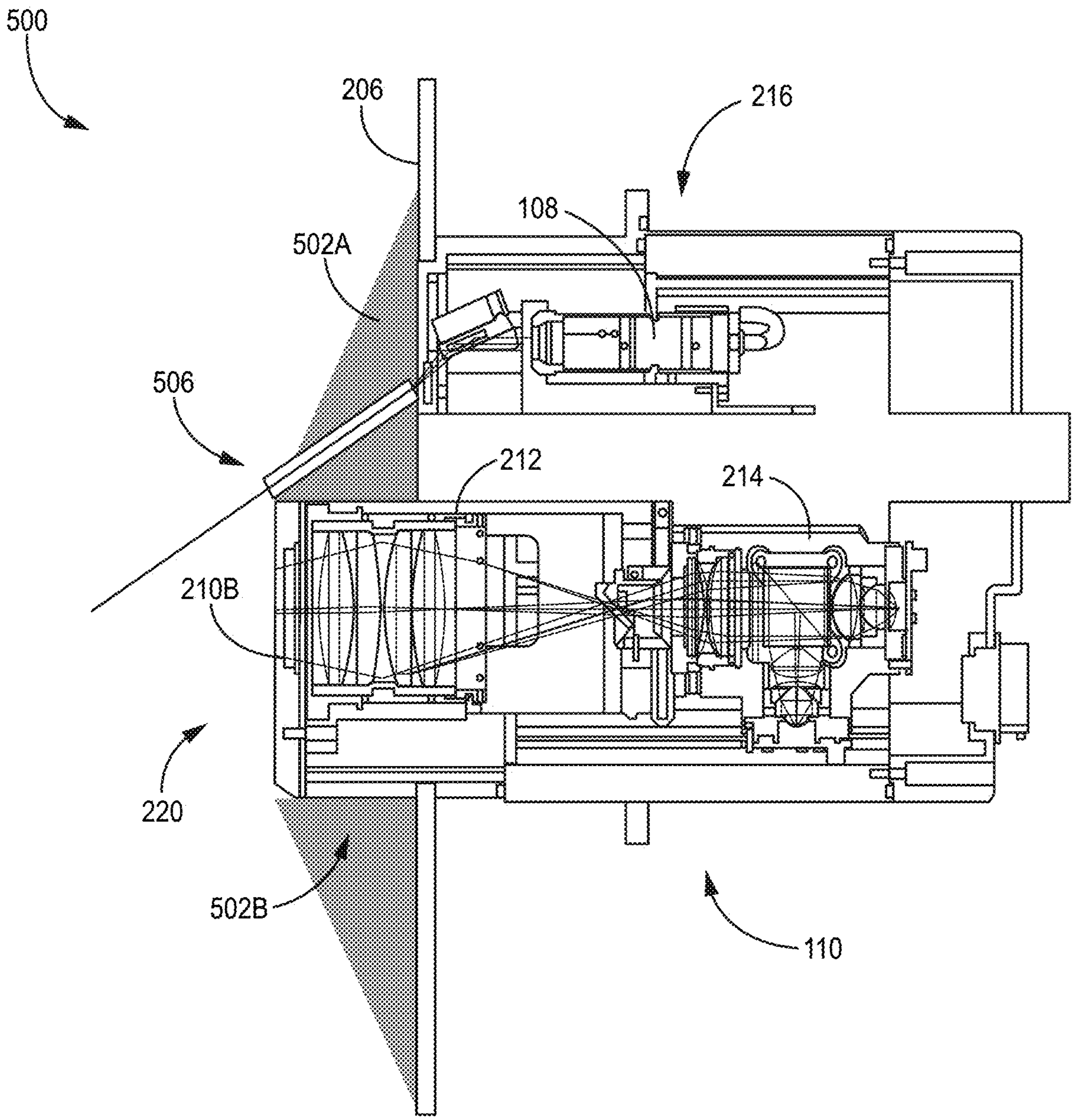
FIG. 5 depicts a schematic diagram of a particle sensor with external surface elements coupled over the transmitting optics, as described in one or more embodiments.

FIG. 5 depicts a schematic diagram of a particle sensor 500 with external surface elements 502A, 502B. Particle sensor 500 operates similarly to the other particle sensors described herein. In the embodiment of FIG. 5, the surface elements 502A, 502B extend further away from the protruding component 220. Another aspect of particle sensor 500 is that surface element 502A covers the transmitting beam from laser 108. Ordinarily, extending surface element 502A to cover aperture 210A would inhibit the transmitting beam from laser 108 from traversing out of the aircraft and into the detection region 105. However, surface element 502A comprises an elongated slit 506 in which the transmitting beam propagates through into the detection region 105. The elongated slit 506 is designed to match the transmitting angle of the beam from laser 108.

In some embodiments, one or more heating elements (not shown in FIG. 5) can be coupled near the elongated slit 506 (e.g., in surface element 502A and/or in the interior of the particle sensor 500). Such heating elements can include heating circuitry such as thermistors that are activated and regulated by a controller. When the aircraft detects that icing conditions are present, the heating elements can direct heat towards the elongated slit 506 to prevent ice buildup in the elongated slit 506 and at the end of the slit 506. Whereas elongated slit 506 can be a small opening in surface element 502A (e.g., by drilling a hole into the surface element 502A or modifying the shape of surface element 502A in the vicinity of laser beam so it does not interfere with the transmitting beam), in some embodiments, protective glass can be placed at the end of the elongated slit 506 to prevent aerosol particles from entering the slit. In other embodiments, elongated slit 506 can comprise an optically transparent medium in the surface element 502A that is optically transparent with respect to the transmitting beam from laser 108. Filling the elongated slit 506 with an optically transparent medium reduces the risk of ice, water, or particulate matter buildup in the elongated slit 506 that may interfere with the propagation of transmitting beam from laser 108. Additionally, the transmitting angle can be selected to cause any water droplets present in the elongated slit 506 to run off and exit into the exterior environment.

Figure 6:
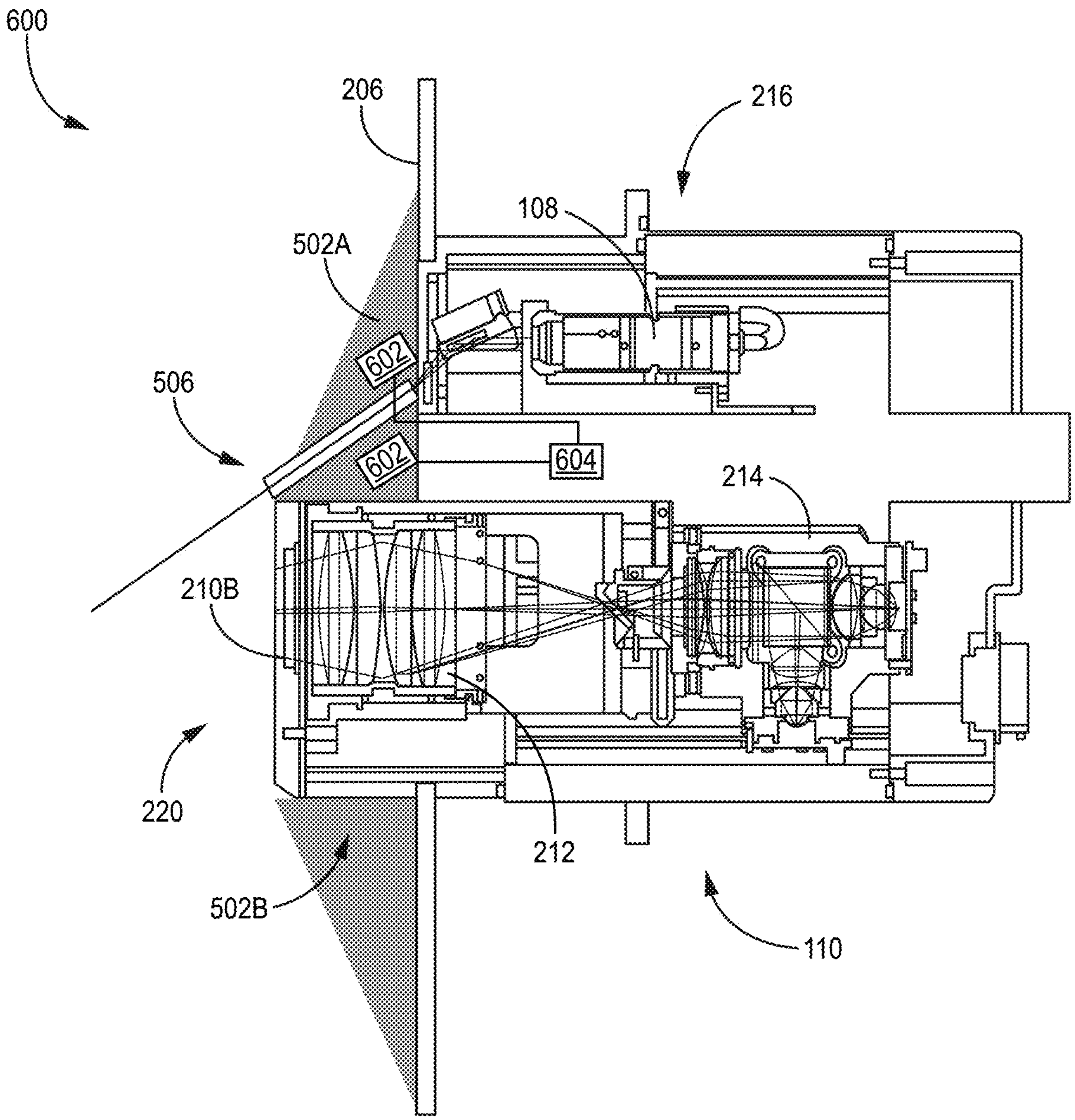
FIG. 6 depicts a schematic diagram of a particle sensor with heating elements disposed in the external surface elements, as described in one or more embodiments.

FIG. 6 depicts a schematic diagram of a particle sensor 600 with heating elements disposed in the external surface elements. Particle sensor 600 operates similarly to the other particle sensors described herein. In FIG. 6, the heating elements described with respect to FIG. 5 are explicitly shown, so that particle surface element 502A comprises two heating elements 602 coupled near the elongated slit 506. Each heating element 602 provides heat to the elongated slit 506 to remove ice present in the elongated slit. Once thawed, liquid droplets can exit elongated slit 506 through the opening of the slit out into the atmosphere. The activation and heating provided by heating elements 602 is regulated by a controller 604, which in the embodiment of FIG. 6 is disposed in the interior of the aircraft in between the transmitting optics 216 and the collection optics 110.

Although FIGS. 2-6 depict embodiments in which the protruding component 220 is a portion of the collection optics 110, in other (or even additional) embodiments the protruding component 220 is a portion of the transmitting optics 216. For example, a portion of the laser 108 may protrude out from the exterior fuselage 206, as a way to achieve a desired transmission angle to the sampling volume 202, as well as reducing distance between the aperture 210A and the sampling volume 202. As noted with respect to FIG. 2B, aerosol content could be present between the aperture 210A and the detection region 105 (the sampling volume 202). The aerosol content may change the properties of the transmitted light, such as optical power or polarization. Reducing the distance between the aperture 210A and the detection region 105 (the sampling volume 202) results in higher measurement accuracy as the transmitted signal is less affected by the aerosol content.

Figure 7:
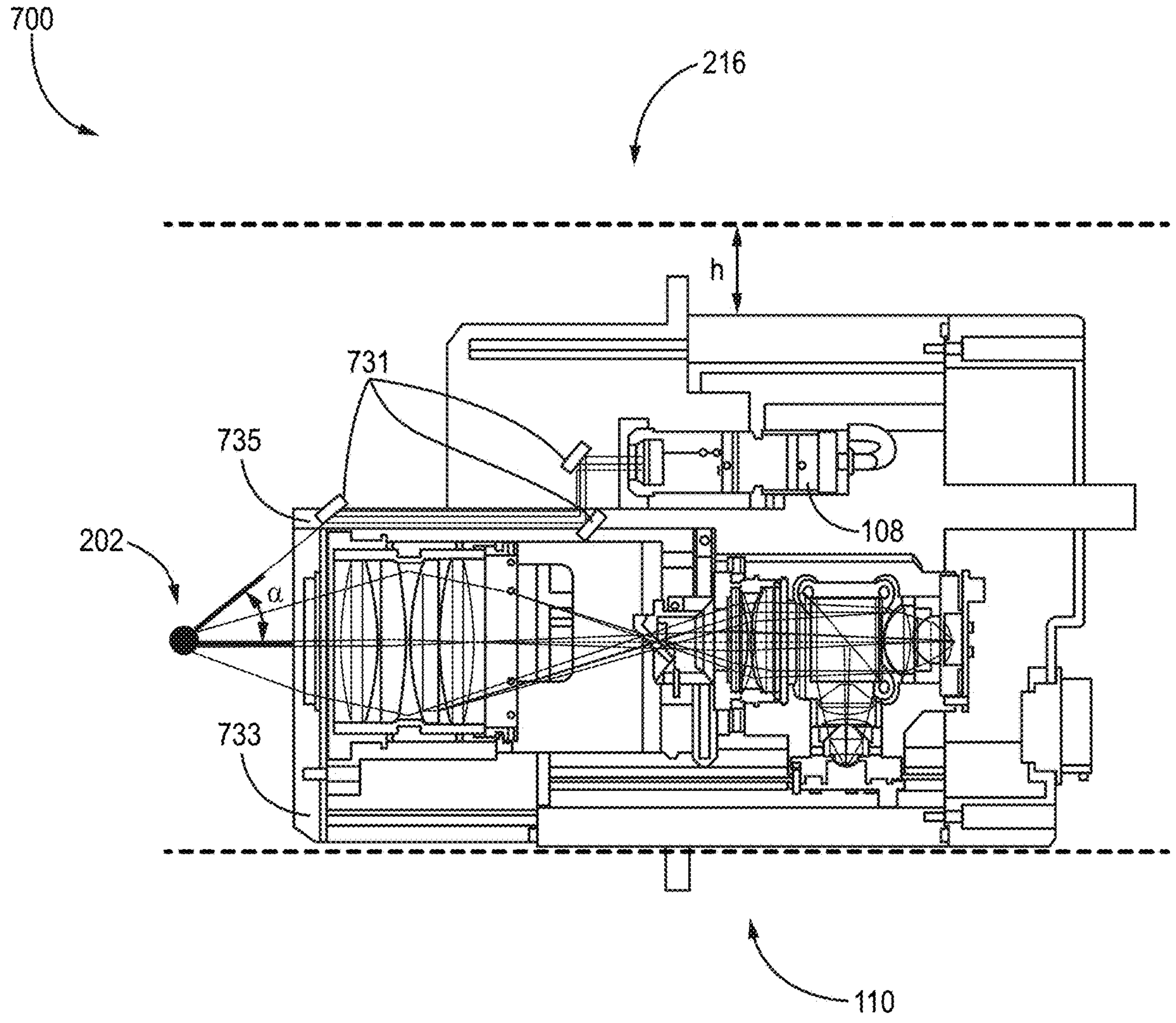
FIG. 7 depicts a schematic diagram of a particle sensor in which a portion of the transmitting optics is disposed into the chassis of the collection optics, as described in one or more embodiments.
Figure 8A:
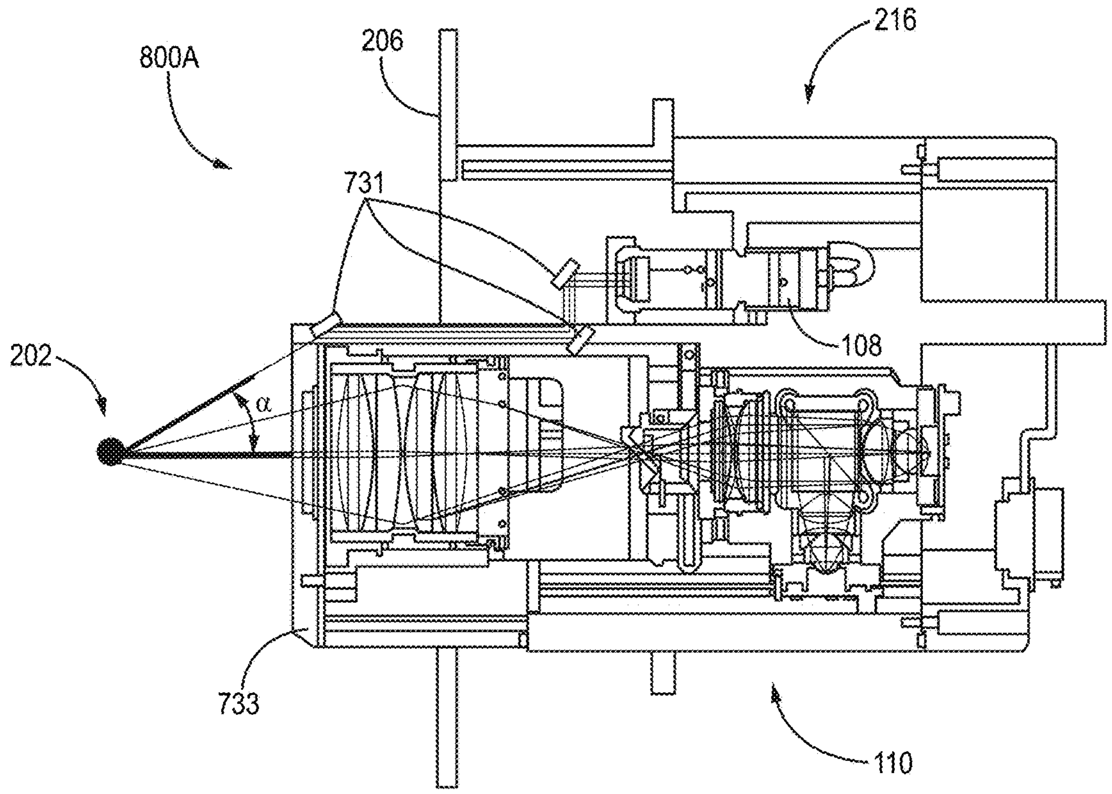
FIGS. 8A-8B depict schematic diagrams of particle sensors with varying transmitting angles, as described in one or more embodiments.
Figure 8B:
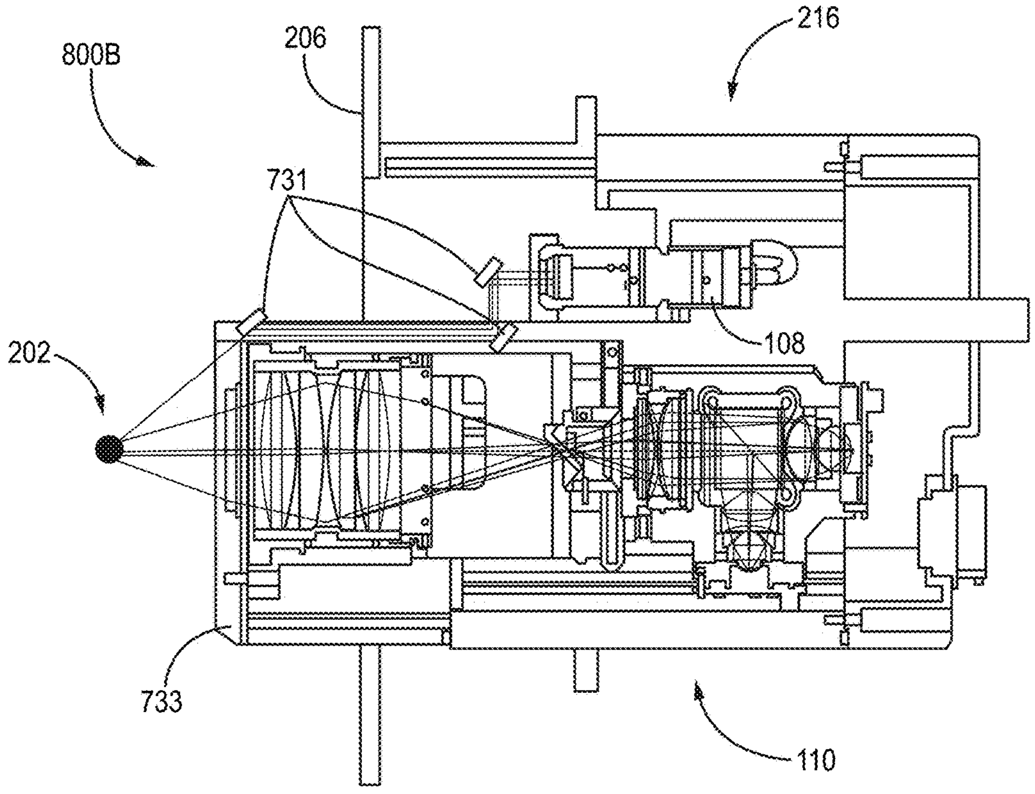
Figure 9:
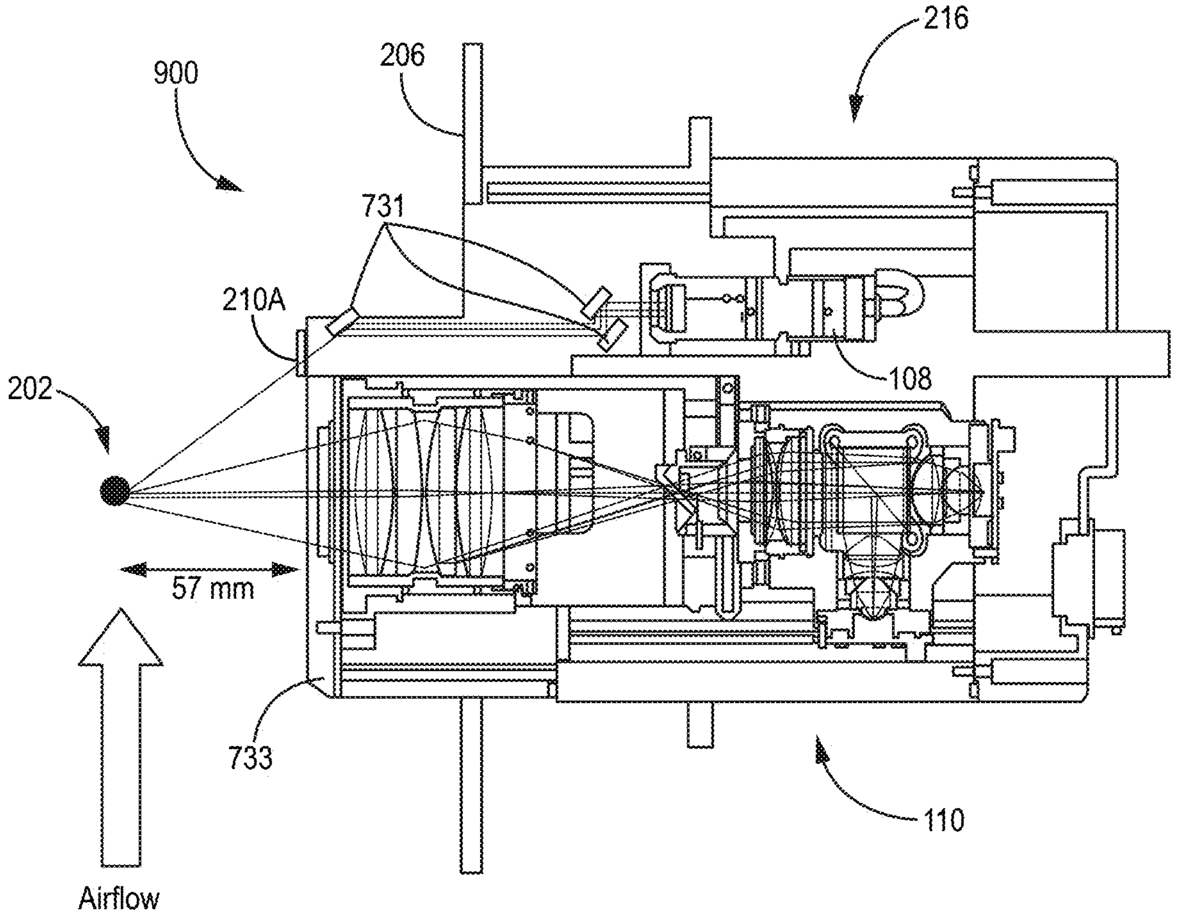
FIG. 9 depicts a schematic diagram of a particle sensor in which a portion of the light source is disposed into the chassis of the collection optics, as described in one or more embodiments.

Referring to FIGS. 7-9 generally, the particle sensor can be modified in other ways. For example, FIG. 7 depicts a schematic diagram of a particle sensor 700 in which a portion of the transmitting optics 216 is disposed into the chassis 733 of the collection optics 110. Specifically, the output from laser 108 is guided to the chassis 733 by one or more reflecting elements 731, which can be mirrors or other optics that reflect the light beam. In doing so, the light beam travels from the portion of the transmitting optics 216 and into the chassis 733 by free space or waveguide propagation through a slit in the chassis 733 that directs the light beam to the edge 735 of the chassis 733 (which in the embodiment of FIG. 7, is the portion that protrudes out from the fuselage of the vehicle). The light beam is then transmitted out from the chassis 733 of the collection optics 110. As a result, the transmission angle α can be further increased (to 40 degrees, for example), which results in enhanced signal-to-noise ratio of the backscattered light processed by processing electronics 112 (not explicitly shown in FIG. 7). Additionally, in transferring the light beam to the chassis 733, the size of the particle sensor 700 can be further reduced relative to particle sensor 200B by a height difference h, and thereby occupying less space on the vehicle.

FIGS. 8A-8B depict modified embodiments of the particle sensor depicted in FIG. 7. Referring to particle sensor 800A, for a maximum protrusion width of 2.4 inches, a protrusion length of 43 mm towards the sampling volume 202, and a sampling distance of 57 mm between the chassis 733 and the sampling volume 202, the transmitting angle α is approximately 28 degrees. Referring to particle sensor 800B, for a maximum protrusion width of 2.4 inches, a protrusion length of 43 mm, and a transmission angle of 40 degrees, the sampling distance between the sampling volume 202 and the chassis 733 is decreased to approximately 36 mm so that now the collection optics 110 is even closer to the sampling volume 202. The size and weight of the particle sensor can be further reduced by optimizing the sampling distance and transmitting angle.

If the chassis 733 shape is cylinder and its maximum protrusion width is 2.4 inches, it is generally not practical to achieve a transmitting angle α of 40 degrees and sampling distance of 57 mm between the chassis 733 and the sampling volume 202. FIG. 9 depicts a schematic diagram of a particle sensor 900 in which a portion of the light source is disposed into the chassis 733 of the collection optics 110. The protruding chassis shape is mostly cylindrical with a diameter of 1.2 inches; however, it has a prolonged diameter of 1.88 inches in the direction where the output from laser 108 is guided to the chassis 733 transmit aperture 210A. This modification allows a transmission angle of 40 degrees with a sampling distance of 57 mm. Chassis 733 can have any arbitrary shape allowing low aerodynamic drag, while satisfying a desired sampling distance with required transmitting angle α. In the embodiment of FIG. 9, the laser 108 is moved inward towards the collection optics 110 to further reduce the size of the sensor. Additionally, the chassis 733 can protrude in the direction of the adjacent airflow to improve aerodynamical efficiency and reduce drag.

The methods and techniques described herein may be implemented at least in part in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as erasable programmable read-only memory (EPROM), electrically-erasable programmable read-only memory (EEPROM), and flash memory devices; magnetic disks such as internal hard disks and removable disks; magneto-optical disks; and the like. Any of the foregoing may be supplemented by, or incorporated in, specially-designed application specific integrated circuits (ASICs).

EXAMPLE EMBODIMENTS

Example 1 includes a system, comprising: transmitting optics comprising a light source configured to direct a light beam to a detection region outside of a vehicle; collection optics configured to capture reflected or scattered light from one or more particles in the detection region; and at least one processor configured to determine one or more characteristics of the one or more particles in the detection region based on the reflected or scattered light, wherein a portion of the collection optics and/or transmitting optics protrudes outward from an exterior surface of the vehicle towards the detection region.

Example 2 includes the system of Example 1, comprising an optical transceiver, wherein the optical transceiver comprises a first and a second optical head, wherein both the first and the second optical head each comprise respective transmitting optics and respective collection optics.

Example 3 includes the system of any of Examples 1-2, wherein the light source is oriented at an angle, wherein the collection optics protrudes outward from the exterior surface of the vehicle.

Example 4 includes the system of any of Examples 1-3, wherein the detection region comprises a sampling volume located in air, wherein the collection optics is oriented in a direction to the sampling volume with the portion of the collection optics protruding towards the sampling volume.

Example 5 includes the system of any of Examples 1-4, wherein a portion of the collection optics protrudes outward, and further comprising one or more surface elements coupled to an exterior of the collection optics, wherein the one or more surface elements is configured to reduce drag caused by the protrusion of the collection optics.

Example 6 includes the system of Example 5, wherein the one or more surface elements comprise an elongated slit that extends from an aperture of the transmitting optics to an end of the one or more surface elements, wherein the elongated slit is oriented parallel to the light beam in which the light beam passes through the elongated slit to the detection region.

Example 7 includes the system of Example 6, comprising one or more heating elements, wherein the one or more heating elements is configured to generate and provide heat to the elongated slit.

Example 8 includes the system of any of Examples 6-7, wherein the elongated slit is filled with an optically transparent medium, wherein the light beam is configured to pass through the optically transparent medium.

Example 9 includes a particle sensor, comprising: transmitting optics comprising a light source configured to direct a light beam to a detection region outside of a vehicle; collection optics configured to capture reflected or scattered light from one or more particles in the detection region; and at least one processor configured to determine one or more characteristics of the one or more particles in the detection region based on the reflected or scattered light, wherein a portion of the collection optics and/or transmitting optics protrudes outward from an exterior surface of the vehicle towards the detection region.

Example 10 includes the particle sensor of Example 9, comprising an optical transceiver, wherein the optical transceiver comprises a first and a second optical head, wherein both the first and the second optical head each comprise respective transmitting optics and respective collection optics.

Example 11 includes the particle sensor of any of Examples 9-10, wherein the light source is oriented at an angle, wherein the collection optics protrudes outward from the exterior surface of the vehicle.

Example 12 includes the particle sensor of any of Examples 9-11, wherein the detection region comprises a sampling volume located in air, wherein the collection optics is oriented in a direction to the sampling volume with the portion of the collection optics protruding towards the sampling volume.

Example 13 includes the particle sensor of any of Examples 9-12, wherein a portion of the collection optics protrudes outward, and further comprising one or more surface elements coupled to an exterior of the collection optics, wherein the one or more surface elements is configured to reduce drag caused by the protrusion of the collection optics.

Example 14 includes the particle sensor of Example 13, wherein the one or more surface elements comprise an elongated slit that extends from an aperture of the transmitting optics to an end of the one or more surface elements, wherein the elongated slit is oriented parallel to the light beam in which the light beam passes through the elongated slit to the detection region.

Example 15 includes the particle sensor of Example 14, comprising one or more heating elements, wherein the one or more heating elements is configured to generate and provide heat to the elongated slit.

Example 16 includes the particle sensor of any of Examples 14-15, wherein the elongated slit is filled with an optically transparent medium, wherein the light beam is configured to pass through the optically transparent medium.

Example 17 includes the particle sensor of any of Examples 14-16, wherein the collection optics is enclosed by a chassis, and further comprising one or more reflecting elements configured to direct the light beam into the chassis, wherein the light beam exits an edge of the chassis towards the detection region.

Example 18 includes the particle sensor of any of Examples 15-17, wherein the one or more heating elements are embedded in the one or more surface elements.

Example 19 includes the particle sensor of any of Examples 9-18, wherein the particle sensor is coupled to a wing or nose of an aircraft.

Example 20 includes a method, comprising: transmitting, by transmitting optics, a light beam to a detection region outside of a vehicle; receiving, by collection optics reflected or scattered light from one or more particles in the detection region; determining one or more characteristics of the one or more particles in the detection region based on the reflected or scattered light, wherein a portion of the collection optics and/or the transmitting optics protrudes outward from an exterior surface of the vehicle towards the detection region.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, comprising:

transmitting optics comprising a light source configured to direct a light beam to a detection region outside of a vehicle;

collection optics configured to capture reflected or scattered light from one or more particles in the detection region; and at least one processor configured to determine one or more characteristics of the one or more particles in the detection region based on the reflected or scattered light, wherein a portion of the collection optics and/or transmitting optics protrudes outward through an exterior surface of the vehicle towards the detection region.

2. The system of claim 1, comprising an optical transceiver, wherein the optical transceiver comprises a first and a second optical head, wherein both the first and the second optical head each comprise respective transmitting optics and respective collection optics.

3. The system of claim 1, wherein the light source is oriented at an angle, wherein the collection optics protrudes outward from the exterior surface of the vehicle and wherein the transmitting optics do not protrude outward through the exterior surface of the vehicle.

4. The system of claim 1, wherein the detection region comprises a sampling volume located in air, wherein the collection optics is oriented in a direction to the sampling volume with the portion of the collection optics protruding towards the sampling volume.

5. The system of claim 1, wherein a portion of the collection optics protrudes outward, and further comprising one or more surface elements coupled to an exterior of the collection optics, wherein the one or more surface elements is configured to reduce drag caused by the protrusion of the collection optics.

6. The system of claim 5, wherein the one or more surface elements comprise an elongated slit that extends from an aperture of the transmitting optics to an end of the one or more surface elements, wherein the elongated slit is oriented parallel to the light beam in which the light beam passes through the elongated slit to the detection region.

7. The system of claim 6, comprising one or more heating elements, wherein the one or more heating elements is configured to generate and provide heat to the elongated slit.

8. The system of claim 6, wherein the elongated slit is filled with an optically transparent medium, wherein the light beam is configured to pass through the optically transparent medium.

9. A particle sensor, comprising:

transmitting optics comprising a light source configured to direct a light beam to a detection region outside of a vehicle;

collection optics configured to capture reflected or scattered light from one or more particles in the detection region; and at least one processor configured to determine one or more characteristics of the one or more particles in the detection region based on the reflected or scattered light, wherein a portion of the collection optics protrudes outward through an exterior surface of the vehicle towards the detection region by at least 10 percent of the sampling distance as measured from the exterior surface of the vehicle to the detection region.

10. The particle sensor of claim 9, comprising an optical transceiver, wherein the optical transceiver comprises a first and a second optical head, wherein both the first and the second optical head each comprise respective transmitting optics and respective collection optics.

11. The particle sensor of claim 9, wherein the portion of the collection optics protrudes outward through the exterior surface of the vehicle towards the detection region by a first distance and wherein the transmission optics protrudes through the exterior surface of the vehicle by a second, different distance.

12. The particle sensor of claim 9, wherein the detection region comprises a sampling volume located in air, wherein the collection optics is oriented in a direction to the sampling volume with the portion of the collection optics protruding towards the sampling volume.

13. The particle sensor of claim 9, and further comprising one or more surface elements coupled to an exterior of the collection optics, wherein the one or more surface elements is configured to reduce drag caused by the protrusion of the collection optics.

14. The particle sensor of claim 13, wherein the one or more surface elements comprise an elongated slit that extends from an aperture of the transmitting optics to an end of the one or more surface elements, wherein the elongated slit is oriented parallel to the light beam in which the light beam passes through the elongated slit to the detection region.

15. The particle sensor of claim 14, comprising one or more heating elements, wherein the one or more heating elements is configured to generate and provide heat to the elongated slit.

16. The particle sensor of claim 14, wherein the elongated slit is filled with an optically transparent medium, wherein the light beam is configured to pass through the optically transparent medium.

17. The particle sensor of claim 14, wherein the collection optics is enclosed by a chassis, and further comprising one or more reflecting elements configured to direct the light beam into the chassis, wherein the light beam exits an edge of the chassis towards the detection region.

18. The particle sensor of claim 15, wherein the one or more heating elements are embedded in the one or more surface elements.

19. The particle sensor of claim 9, wherein the transmitting optics has a light beam axis and the collection optics has an optical axis;

wherein the light beam axis of the transmitting optics forms an angle with the optical axis of the collection optics such that the light beam from the transmitting optics travels unimpeded by the collection optics to the detection region; and wherein the sampling distance is reduced by a depth of the protrusion of the collection optics.

20. A method, comprising:

transmitting, by transmitting optics, a light beam along a light beam axis to a detection region outside of a vehicle;

receiving, by collection optics having an optical axis, reflected or scattered light from one or more particles in the detection region;

determining one or more characteristics of the one or more particles in the detection region based on the reflected or scattered light, wherein a portion of the collection optics protrudes outward through an exterior surface of the vehicle towards the detection region by a protrusion depth;

wherein the light beam axis of the transmitting optics forms an angle with the optical axis of the collection optics such that the light beam from the transmitting optics travels unimpeded to the detection region; and wherein the sampling distance, measured from the detection region to the exterior surface of the vehicle, is reduced by the protrusion depth of the collection optics.

* * * * *